(12) United States Patent  (10) Patent No.: US 7,792,409 B2
Kimura  (45) Date of Patent: Sep. 7, 2010

(54) INFORMATION PROCESSING APPARATUS AND CONTROL METHOD THEREFOR

(75) Inventor: Masatoshi Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1312 days.

(21) Appl. No.: 11/275,025

(22) Filed: Dec. 2, 2005

(65) Prior Publication Data

US 2007/0047904 A1 Mar. 1, 2007

(30) Foreign Application Priority Data

Aug. 30, 2005 (JP) .............................. 2005-250363

(51) Int. Cl.
*H04N 5/91* (2006.01)
*H04N 7/00* (2006.01)

(52) U.S. Cl. ................................ 386/46; 386/83; 713/2

(58) Field of Classification Search .................. 386/46, 386/83; 713/2
See application file for complete search history.

(56) References Cited

U.S. PATENT DOCUMENTS

| | | | |
|---|---|---|---|
| 4,949,085 A * | 8/1990 | Fisch et al. | 340/7.52 |
| 6,065,123 A * | 5/2000 | Chou et al. | 713/322 |
| 6,804,300 B1 | 10/2004 | Hoshino et al. | |
| 6,930,725 B1 * | 8/2005 | Hayashi | 348/373 |
| 2006/0048207 A1 * | 3/2006 | Martin | 725/135 |

FOREIGN PATENT DOCUMENTS

| | | |
|---|---|---|
| JP | 6-20776 | 1/1994 |
| JP | 2001-33755 | 2/2001 |
| JP | 2001-186423 | 7/2001 |
| JP | 2001-216141 | 8/2001 |
| JP | 2001-298654 | 10/2001 |
| JP | 2002-94961 | 3/2002 |
| JP | 2003-248544 | 9/2003 |
| JP | 2004-32126 | 1/2004 |
| JP | 2004-234263 | 8/2004 |
| JP | 2004-336693 | 11/2004 |

OTHER PUBLICATIONS

Office Action mailed on Sep. 30, 2008 and issued in corresponding Japanese Patent Application No. 2005-250363.
Japanese Decision of Rejection issued on Mar. 3, 2009 in corresponding Japanese Patent Application 205-250363.
Japanese Office Action issued on Dec. 16, 2008 in corresponding Japanese Patent Application 2005-250363.

* cited by examiner

*Primary Examiner*—Thai Tran
*Assistant Examiner*—Girumsew Wendmagegn
(74) *Attorney, Agent, or Firm*—Staas & Halsey LLP

(57) ABSTRACT

The present invention provides an information processing apparatus, comprising: a video recording unit for video recording a received broadcast program; a video recording indicator light for indicating visually whether the video recording is in progress or not; and a video recording indicator light control unit, being furnished as a part of a basic input/output system (BIOS), for controlling a turning on and off of the video recording indicator light.

6 Claims, 4 Drawing Sheets

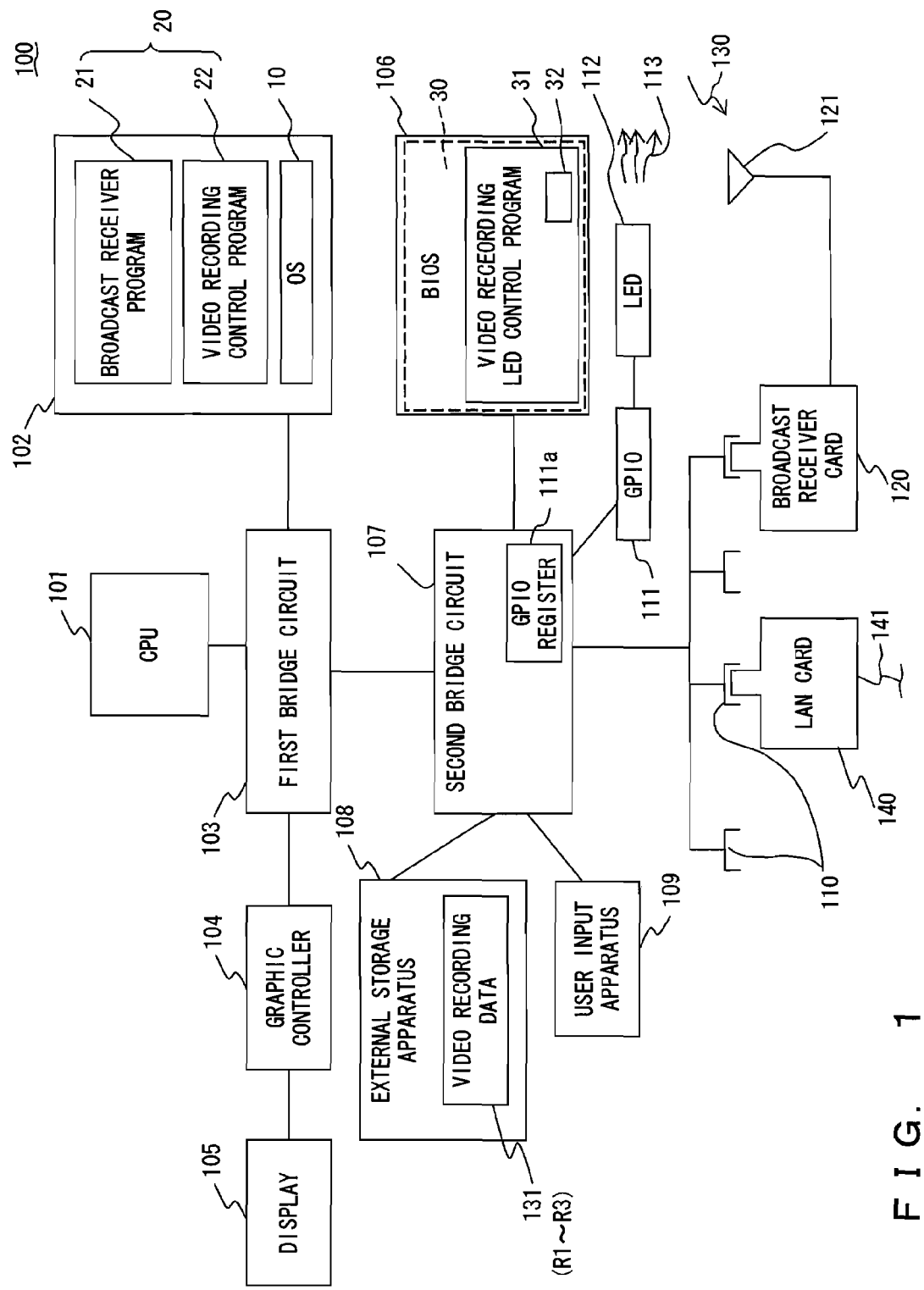
F I G. 1

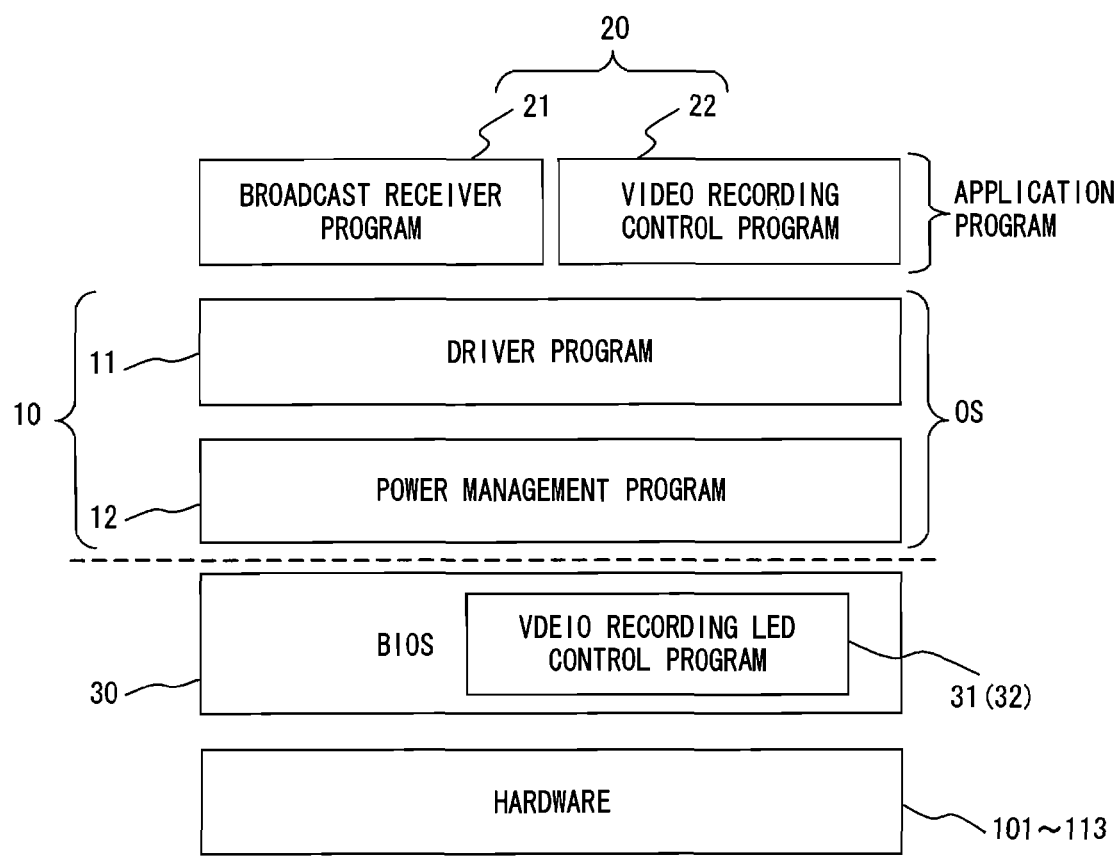
F I G. 2

INFORMATION PROCESSING APPARATUS AND CONTROL METHOD THEREFOR

BACKGROUND OF THE INVENTION

1. Field of the Invention

The present invention relates to an information processing technique, and particularly to a technique effectively applicable to controlling an indicator light for an information processing apparatus, such as a personal computer, comprising an input and output functions such as a video recording function.

2. Description of the Related Art

In recent years, for instance, personal computers (simply "PC" hereinafter) equipped with a broadcast receiver function and a video recording function for the received broadcast have been brought to the market in response to required shifts to high performance and multi-functionality of information processing apparatus such as a PC (e.g., refer to a patent document 1).

Such a PC comprising a video recording function is conceivably configured to equip a video recording LED (light emitting diode) as an indicator light for notifying the user of either "video recording" or otherwise and light up the video recording LED during a video recording, thereby preventing the user from operating it incorrectly, such as by shutting off the power, ending the video recording.

Meanwhile, some of the recent PCs brought to the market have a capability of supporting a plurality of concurrent video recording processes, but a display control of a video recording LED for indicating whether a video recording is in progress does not support a plurality of video recording, resulting in a none display of the video recording LED at the time of processing the plurality of video recording processes.

A conceivable method for displaying a video recording LED at the time of a plurality of concurrent video recording is for example to equip management information in a part of a registry (i.e., a database which records a complete set of information relating to a PC system such as a hardware configuration, device driver information and application information) of a commercial OS (operating system), and control a flashing of the video recording LED by a driver program, which constitutes a part of the operating system, accesses the management information.

The control method of the video recording LED by the driver program, however, is faced with a technical problem of a difficulty in controlling the flashing of the video recording LED on a plurality of concurrent video recording accurately because the values of management information fluctuate at starting, an end session, an abnormal end session, et cetera, of a PC. And, if there is a pressing need to use this method for performing a display control of the video recording LED at a plurality of concurrent video recording, another technical problem arises in that a correction program has to be specifically installed for correcting the management information stored by the registry, et cetera, hence the control of the video recording LED becomes unnecessarily complex.

Moreover, it is anticipated that in the future a case where a virtualization technique builds up, on a single PC, a plurality of virtual systems having respectively different operating systems will occur, together with PC-use general purpose microprocessors becoming higher performance, but the management of a video recording LED by a driver level program dependent on an operating system can not manage a plurality of video recording carried out by the individual virtual systems.

In the meantime, a patent document 2 has disclosed a technique for furnishing an LCD (liquid crystal display) drive apparatus with an LCD controller and a BIOS (Basic Input/Output System) and the BIOS sets up a drive method for the LCD controller depending on a kind of LCD to be connected, thereby enabling a single LCD drive apparatus to control a plurality of LCDs. However, the above described control of a video recording LED is not disclosed.

[Patent document 1] laid-open Japanese patent application publication No. 2001-186423

[Patent document 2] laid-open Japanese patent application publication No. 2001-33755

SUMMARY OF THE INVENTION

A purpose of the present invention is to provide an information processing apparatus capable of performing an accurate visual indication of whether a video recording is in progress by an indicator light for a plurality of concurrent video recording without being influenced by an operation state, et cetera, of the information processing apparatus.

Another purpose of the present invention is to provide an information processing apparatus capable of performing an accurate visual indication of a video recording in progress by an indicator light for a plurality of concurrent video recording in the information processing apparatus in which a virtual system operates.

A first aspect of the present invention is to provide an information processing apparatus, comprising:

a video recording unit for video recording a received broadcast program;

a video recording indicator light for indicating visually whether the video recording is in progress or not; and a video recording indicator light control unit, being furnished as a part of a basic input/output system (BIOS), for controlling a turning on and off of the video recording indicator light.

A second aspect of the present invention is to provide a control method for an information processing apparatus comprising:

a video recording unit for video recording a received broadcast program;

a video recording indicator light for indicating visually whether the video recording is in progress or not; and a basic input/output system (BIOS); comprising the steps of furnishing a video recording indicator light control unit for controlling a turning on and off of the video recording indicator light as a part of the BIOS, the video recording indicator light control unit incrementing a counter by one at a start notification of the video recording from the video recording unit and decrementing the counter by one at an end notification of the video recording, and the video recording indicator light control unit making the video recording indicator light turn on if a value of the counter is one or greater, while making the video recording indicator light turn off and initializing the aforementioned counter to zero, if a value of the counter is zero or smaller.

A third aspect of the present invention is to provide an information processing apparatus, comprising:

an input and output unit for inputting and outputting information;

an indicator light for indicating visually whether the input and output are in progress or not; and an indicator light control unit, being furnished as a part of a basic input/output system (BIOS), for controlling a turning on or off of the indicator light.

A fourth aspect of the present invention is to provide a control method for an information processing apparatus comprising:

an input and output unit for inputting and outputting information;

an indicator light for indicating visually whether the input and output are in progress or not; and a basic input/output system (BIOS); comprising the steps of furnishing an indicator light control unit to a part of the BIOS for controlling a turning on and off of the indicator light, the indicator light control unit incrementing a counter by one at a start notification of the input and output from the input and output unit, and decrementing the counter by one at an end notification of the input and output, and the indicator light control unit making the video recording indicator light turn on if a value of the counter is one or greater, while making the video recording indicator light turn off and initializing the aforementioned counter to zero, if a value of the counter is zero or smaller.

According to the above described present invention, since a video recording indicator light control unit for managing a video recording state, as one of input and output states, is furnished as a part of a BIOS which is the basic software for carrying out an initialization or control of the hardware, the video recording indicator light control unit is never influenced by a starting, an end session or an abnormal end session of an operating system or application operating thereon. Because of this, it is possible to indicate accurately whether an individual video recording in progress or not by way of turning on or off of a video recording indicator light, in the case of video-recording plural pieces of video image information received from a broadcast or network, to an external storage apparatus, concurrently.

Also, even in the case of operating a plurality of virtual systems on an information processing apparatus, the BIOS has an existence independent of those virtual systems, therefore it is possible to accurately indicate the visual display of a plurality of concurrent video recording operations by the video recording indicator light control unit furnished in the BIOS without being influenced by a starting, an end session or an abnormal end session, et cetera, of an individual virtual system.

BRIEF DESCRIPTION OF THE DRAWINGS

FIG. 1 is a block diagram exemplifying a configuration of an information processing apparatus according to an embodiment of the present invention;

FIG. 2 is a conceptual diagram exemplifying a software configuration for an information processing apparatus according to an embodiment of the present invention;

DESCRIPTION OF THE PREFERRED EMBODIMENTS

Figure 3:
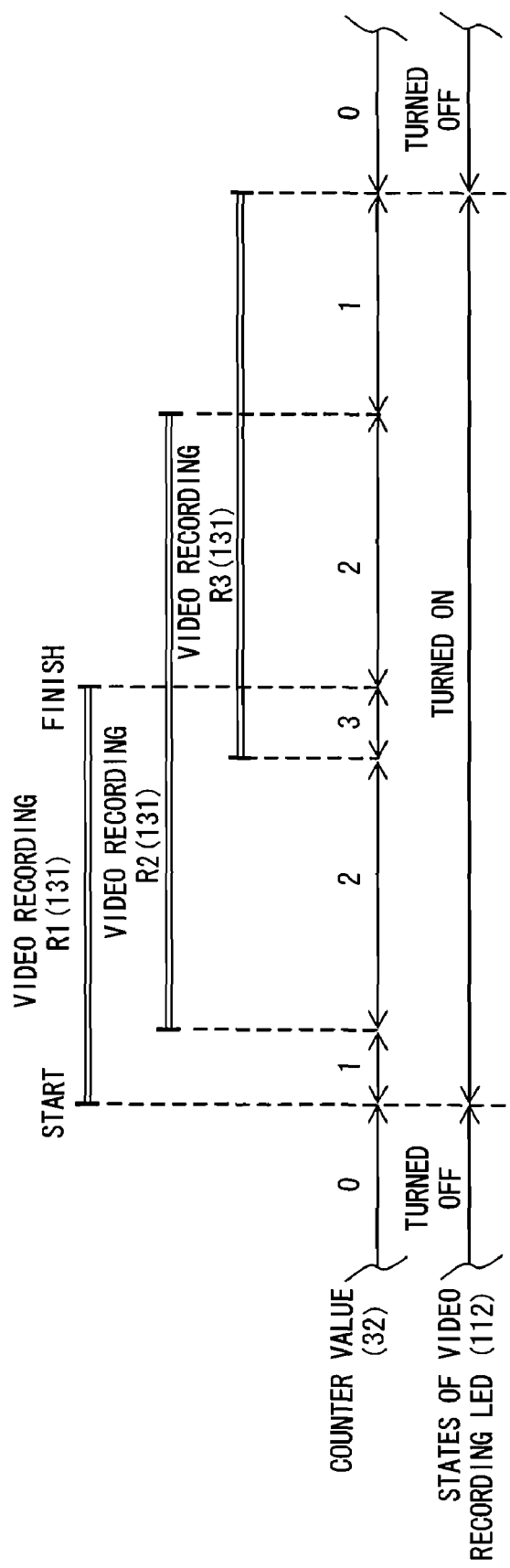
FIG. 3 is a conceptual diagram exemplifying the operations of a video recording LED control program for an information processing apparatus according to an embodiment of the present invention.

The following is a detailed description of the preferred embodiment of the present invention while referring to the accompanying drawings.

FIG. 1 is a block diagram exemplifying a configuration of an information processing apparatus according to an embodiment of the present invention; and FIG. 2 is a conceptual diagram exemplifying a software configuration therefor.

The information processing apparatus 100 according to the present embodiment is a stationary type or a portable type personal computer (simply "PC" hereinafter). And the PC is equipped with a broadcast receiver function and a video recording function for video-recording the received broadcast as described later.

The information processing apparatus 100 comprises a CPU (Central Processing Unit) 101, a main storage 102, a first bridge circuit 103, a graphic controller 104, a display 105, a ROM 106, a second bridge circuit 107, an external storage apparatus 108 (i.e., a video recording unit), a user input apparatus 109, an extension bus slot 110, a general purpose input & output circuit 111, a video recording LED 112 (i.e., a video recording indicator light), et cetera, as hardware.

The main storage 102 and graphic controller 104 are connected to the CPU 101 by way of the first bridge circuit 103.

And the ROM 106, external storage apparatus 108, user input apparatus 109, extension bus slot 110 and general purpose input & output circuit 111 are interconnected by way of the second bridge circuit 107; and they are also connected to the CPU 101, main storage 102 and graphic controller 104 by way of the first bridge circuit 103.

The CPU 101 controls operations of the information processing apparatus 100 by executing a program stored by the main storage 102 and a later described ROM 106.

The main storage 102 is comprised by a storage medium such as DRAM, stores a program and data accessed by the CPU 101. The present embodiment is configured to install, in the main storage 102, an operating system 10 and an application program 20 operating under the control thereof.

The first bridge circuit 103 controls mutual information transfers among the CPU 101, main storage 102, graphic controller 104 and the second bridge circuit 107, all of which are connected to the aforementioned first bridge circuit 103.

The graphic controller 104 displays an image or a video picture in the display 105 based on an instruction from the CPU 101 by way of the first bridge circuit 103.

The display 105, constituted by an LCD display, performs a visualization display of information input from the graphic controller 104. And a speaker (not shown herein) is installed in the display 105 for performing an acoustic output.

The ROM 106 is constituted by a storage medium such as a nonvolatile rewritable electrically erasable EEPROM for example. The ROM 106 stores a BIOS 30, the basic software for the above described hardware initialization and control of the information processing apparatus 100.

The second bridge circuit 107 controls mutual information transfers among the ROM 106, external storage apparatus 108, user input apparatus 109, extension bus slot 110, general purpose input & output circuit 111 and the first bridge circuit 103, all of which are connected to the aforementioned second bridge circuit 107.

The external storage apparatus 108 comprises a storage apparatus such as an HDD (a hard disk drive) comprising a nonvolatile storage medium for example. The external storage apparatus 108 stores the operating system 10 and application program 20 which are installed in the main storage 102 and will be loaded thereto on an as required basis.

Also the external storage apparatus 108 stores a management database such as a registry (not shown herein) which centrally stores information for the operating system 10 to manage the information processing apparatus 100.

In the case of the present embodiment, the external storage apparatus 108 also stores a later described video recording data 131.

The user input apparatus 109 is constituted by information input apparatuses such as a keyboard, mouse and microphone, and is used for the user to input a command and information to the information processing apparatus 100.

The extension bus slot 110 provides connection means for connecting peripheral equipment conforming to a bus standard such as that of the PCI bus (peripheral components interconnect bus) for example. In the case of the present embodiment, the extension bus slot 110 is connected to peripheral equipment such as a later described broadcast receiver card 120 and a LAN card 140.

The general purpose input & output circuit 111 controls a turning on and off of the video recording LED 112 based on an instruction from the CPU 101. That is, the second bridge circuit 107 is equipped with a general purpose input & output register 111a and the general purpose input & output circuit 111 which controls a turning on and off of the video recording LED 112 according to data which is set in the general purpose input & output register 111a.

The video recording LED 112 carries out an emission start (turning on) or emission stop (turning off) of a light 113 as a result of being controlled by the general purpose input & output circuit 111.

The broadcast receiver card 120, being a peripheral equipment inserted into the extension bus slot 110, receives broadcast data 130 by way of a tuner (not shown herein) and an antenna 121.

The LAN card 140, being a peripheral equipment inserted into the extension bus slot 110, accomplishes a LAN (local area network) interface for connecting the information processing apparatus 100 to a LAN media 141 such as a radio wave or a cable.

Incidentally the broadcast data 130 can also be received as telecommunication information from the LAN media 141 by way of the LAN card 140, in lieu of being limited to receiving from the broadcast receiver card 120 as a radio wave.

FIG. 2 is a conceptual diagram exemplifying a software configuration for the information processing apparatus 100 according to the present embodiment.

In the hardware constituting the information processing apparatus 100, exists a BIOS 30 comprising a group of programs for carrying out the initialization and control of the aforementioned hardware, and on the BIOS 30 exists the operating system 10 and application program 20 operating under the hierarchy thereof.

The BIOS 30 is implemented as software such as a program for carrying out the initialization and control of the hardware including the first bridge circuit 103, the second bridge circuit 107, the main storage 102, et cetera; a program for accomplishing a minimization of the overall power consumption of the information processing apparatus 100; a program for accomplishing an automatic recognition (i.e., plug and play) of peripheral equipment which are inserted into or taken out of the extension bus slot 110 during the operation; et cetera.

The BIOS 30 is not influenced by a power on, a power shutoff, an abnormal end session, et cetera, of the information processing apparatus 100 since it is stored in a nonvolatile ROM 106.

In the case of the present embodiment, a video recording LED control program 31 (i.e., a video recording indicator light control unit) for controlling a turning on and off of the video recording LED 112 and a counter 32 (i.e., a video recording indicator light control unit) to be used by the video recording LED control program 31 exist in a part of the BIOS 30.

In this case, since the video recording LED control program 31 and counter 32 of the BIOS 30 are independent of the operating system 10, they are not influenced by a starting, an end session, an abnormal end session, et cetera, of the operating system 10 or the application program 20 operating under the hierarchy thereof.

The operating system 10 includes a driver program 11 and a power management program 12 for example.

The driver program 11 is software providing a control interface for the application program 20 utilizing the hardware.

The power management program 12 comprises software such as an ACPI (advanced configuration and power interface) for carrying out a power source management in order to accomplish a power saving on the information processing apparatus 100.

In the case of the present embodiment, the application program 20 includes a broadcast receiver program 21 and a video recording control program 22 (i.e., a video recording control unit) for example.

The broadcast receiver program 21, receiving a user instruction by way of the user input apparatus 109, controls a selection of a receiving channel of the above described broadcast receiver card 120, a decoding processing of the broadcast data 130, et cetera, receives the broadcast data 130 and outputs the received content in the display 105 as a video image and sound.

The video recording control program 22 carries out the processing of recording the broadcast data 130 received by the broadcast receiver card 120 in the external storage apparatus 108 as video recording data 131 based on the user instruction or reservation information by way of the user input apparatus 109.

In the case of the present embodiment, the broadcast receiver card 120 is capable of receiving different broadcast data 130 from a plurality of channels concurrently. In response to this, the video recording control program 22 comprises the function of video-recording each of a plurality of broadcast data 130 concurrently by setting up a discretionary start time and a discretionary finish time, respectively.

The video recording LED control program 31 furnished to the BIOS 30 sets a turning-on instruction data in the general purpose input & output register 111a by using a notification of a video recording start from the video recording control program 22 as the trigger and makes the video recording LED 112 turn on by way of the general purpose input & output circuit 111, thereby notifying the user of a video recording in progress. It also sets a turning-off instruction data in the general purpose input & output register 111a by using a notification of a video recording finish as the trigger and makes the video recording LED 112 turnoff, thereby notifying the user of a video recording finish.

Note here that the counter 32 furnished within the BIOS 30 is used for accomplishing the control of making the video recording LED 112 turn on when at least one recording is in progress and then making the video recording LED 112 turnoff at the time of finishing all the video recording in relation to a plurality of video recording processes with different start and finish times.

That is, the video recording LED control program 31 increments the counter 32, which is initialized to "0", every time a notification of a video recording start is received from the video recording control program 22 and decrements the counter 32 every time a notification of a video recording finish is received as exemplified by FIG. 3.

And, if a value of the counter 32 is "0" or smaller, the value thereof is initialized to "0" and the video recording LED 112 is made to turn off, while if a value of the counter 32 is one or greater, the video recording LED 112 is made to turn on.

By this configuration, even if video recording processes R1, R2 and R3 corresponding to the each of a plurality of video recording data 131 with the different start and finish clock times are carried out in parallel with a part thereof being overlapped with one another for example, the video recording LED 112 is certainly turned on when at least one recording is in progress and the video recording LED 112 can be turned off when all the video recording processing are finished.

Figure 4:
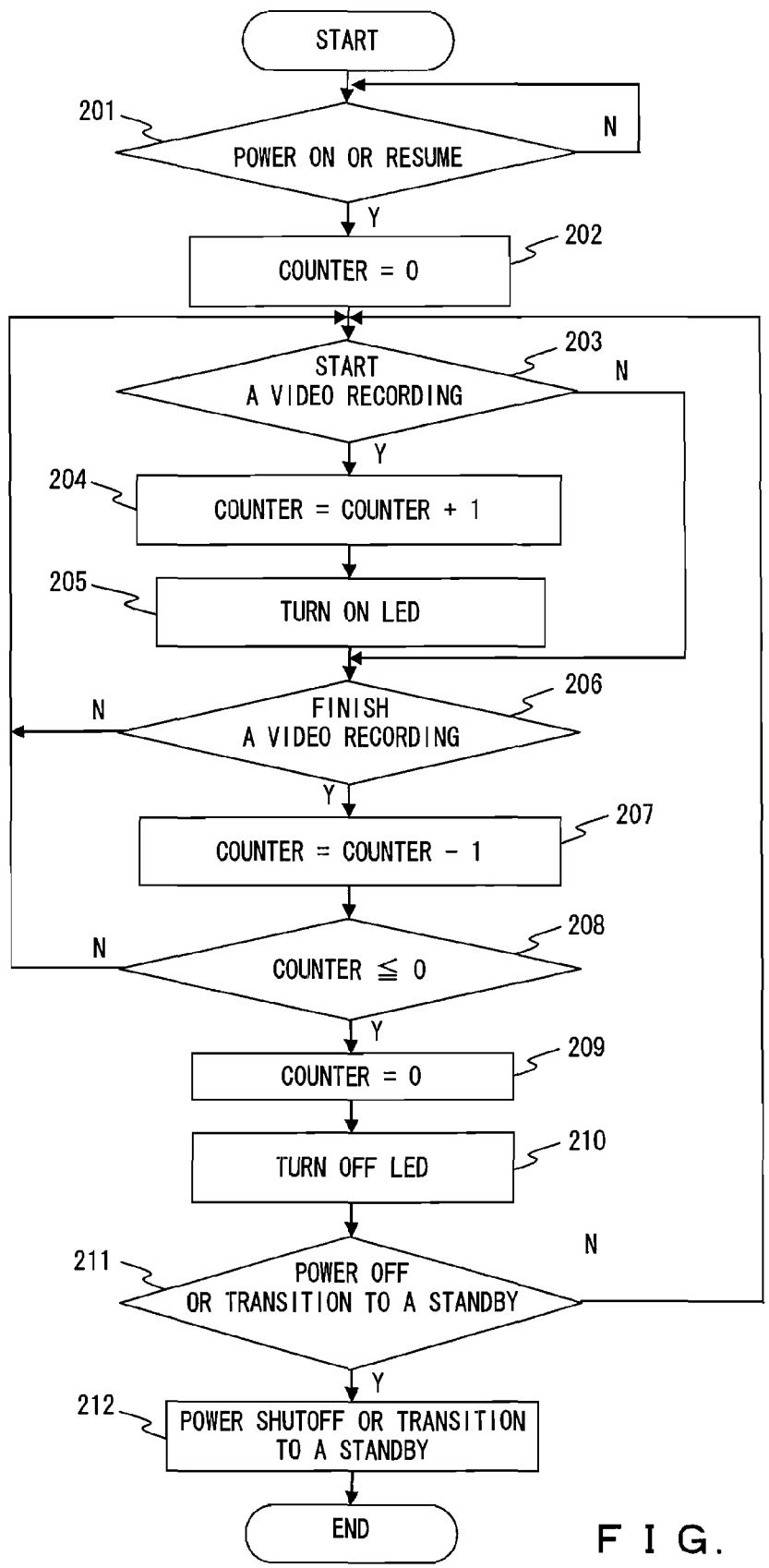
FIG. 4 is a flow chart exemplifying the operations of a video recording LED control program for an information processing apparatus according to an embodiment of the present invention.

FIG. 4 is a flow chart exemplifying the operations of the video recording LED control program 31 of the BIOS 30 in this case.

The video recording LED control program 31 in the BIOS 30, as the power on or resume (i.e., a recovery from a rest state) of the information processing apparatus 100 occurs (step 201), initializes the counter 32 equipped in the BIOS 30 to "0" (step 202).

Then checks a presence or absence of notification of a video recording start from the video recording control program 22 (step 203) and, if a video recording start is detected, increments the counter 32 by one (step 204) to make the video recording LED 112 turn on, thereby notifying the user of the video recording start (step 205).

Then checks a presence or absence of notification of a video recording finish from the video recording control program 22 (step 206) and, if a video recording finish is not detected, the process returns to the step 203.

If a video recording finish is detected, decrement the counter 32 by one (step 207), followed by checking if the value of the counter 32 is "0" or smaller (step 208) and, if it is not "0" or smaller, the process returns to the step 203.

By this configuration, if a plurality of video recording is carried out, the video recording LED 112 is maintained in a turned-on state as long as at least one video recording is in progress.

If the value of the counter 32 is "0" or smaller in the above described step 208, then all the video recording processes are regarded as finished and the value of the counter 32 is initialized to "0" (step 209) and at the same time the video recording LED 112 is made to turn off (step 210).

Then, judges whether or not an execution instruction for the power shutoff or a standby (i.e., a transition to a resting state) from the user or the power management program 12, et cetera, to the information processing apparatus 100 exists (step 211) and, if an execution instruction for the power shutoff or a standby does not exist, the process returns to the above described step 203.

If the result of the judgment in the step 211 is that an execution instruction for the power shutoff or a standby exists, carries out the power shutoff or standby of the information processing apparatus 100 (step 212).

As described above, the present embodiment is configured to be furnished inside the BIOS 30, which is not influenced by the operating states of the operating system 10, the application program 20, et cetera, with the video recording LED control program 31 and counter 32, and therefore the counter is easily and securely reset at a starting, an end session, or an abnormal end session of the information processing apparatus 100, operating system 10 and application program 20, leaving no possibility of an incorrect counter value remaining set in the counter 32 and hence preventing the video recording LED 112, which indicates a video recording, from being turned on abnormally by a concise control.

In other words, this configuration eliminates cumbersome management which would require the equipping of a special program for initializing a counter separately from software for managing the video recording LED 112 as with the conventional case in which such a counter is equipped in a part of the operating system 10.

As a result, a display of a video recording in progress by the video recording LED 112 can be accurately accomplished for a plurality of concurrent video recording processes by the video recording control program 22.

And even in the case of operating, concurrently, a plurality of virtual systems under the same or different operating systems on a single information processing apparatus 100, the BIOS 30 is not influenced by such virtual systems, and therefore it is possible to manage a video recording indication by the video recording LED 112 for a video recording process which is carried out on each of the virtual systems by the video recording LED control program 31 and counter 32 within the BIOS 30.

Note that it is obvious that the present invention can be changed in various possible ways within the scope of the present invention, in lieu of being limited by the above described embodiment.

For instance, in the video recording processing by the video recording control program 22, the broadcast data 130 received from the broadcast receiver card 120 and another broadcast data 130 received from the LAN card 140 may be video-recorded in the external storage apparatus 108 in parallel with a plurality of video recording data 131. In such a case, a plurality of video recording processing can be managed correctly by the video recording LED control program 31 and counter 32 which are equipped in the BIOS 30.

Also note, it goes without saying that the configuration of the above described information processing apparatus 100 is just one example, allowing various changes.

Meanwhile, the exemplification has been the case of accomplishing a video recording indication corresponding to a video recording process by using the video recording LED 112, but the present invention is not limited as such, but a possible application is a process of indicating visually a presence or absence of a general input and output process by turning on or off of an LED. That is, a video recording processing for recording, in the external storage apparatus 108, a broadcast content received by way of the broadcast receiver card 120 or the LAN card 140 is just one example of an input and output of the information processing apparatus 100.

According to the present invention, it is possible to carry out a visual indication of video recording state correctly by an indicator light for a plurality of concurrent recording without an influence of an operating state of an information processing apparatus.

And in an information processing apparatus operating a virtual system, it is possible to carry out a visual indication of video recording state correctly by an indicator light for a plurality of concurrent recording.

[Additional Statement 1]

A control method for an information processing apparatus comprising:

an input and output unit for inputting and outputting information;

an indicator light for indicating visually whether the input and output is in progress or not; and a basic input/output system (BIOS); comprising the steps of furnishing an indicator light control unit as a part of the BIOS for controlling a turning on and off of the indicator light, the indicator light control unit incrementing a counter by one at a start notification of the input and output from the input and output unit, and decrementing the counter by one at an end notification of the input and output from said unit, and the indicator light control unit making the video recording indicator light turn on if a value of the counter is one or greater, while making the video recording indicator light turn off and initializing the aforementioned counter to zero, if a value of the counter is zero or smaller.

[Additional Statement 2]

The control method for an information processing apparatus according to additional Statement 1, wherein the information processing apparatus is a personal computer.

What is claimed is:

1. An information processing apparatus, comprising:
   a video recording unit for video recording a received broadcast program;
   a video recording indicator light for indicating visually whether the video recording is in progress or not; and
   a video recording indicator light control unit, being furnished as a part of a basic input/output system (BIOS) and including a counter that indicates the number of broadcast programs being video recorded, for controlling a turning on and off of the video recording indicator light depending on the number indicated by the counter,
   wherein the counter is incremented by one at a start notification of said video recording from said video recording unit and decremented by one at an end notification of the video recording therefrom, and
   said video recording indicator light control unit comprises a control logic for making said video recording indicator light turn on if a value of the counter is one or greater, while making the video recording indicator light turn off and initializing the aforementioned counter to zero, if a value of the counter is zero or smaller.

2. The information processing apparatus according to claim 1, wherein
   the information processing apparatus is a personal computer comprising a broadcast receiver function.

3. A control method for an information processing apparatus comprising a video recording unit for video recording a received broadcast program;

a video recording indicator light for indicating visually whether the video recording is in progress or not; and a basic input/output system (BIOS); comprising the steps of furnishing a video recording indicator light control unit for controlling a turning on and off of the video recording indicator light as a part of the BIOS, the video recording indicator light control unit incrementing a counter by one at a start notification of the video recording from the video recording unit and decrementing the counter by one at an end notification of the video recording, and the video recording indicator light control unit making the video recording indicator light turn on if a value of the counter is one or greater, while making the video recording indicator light turn off and initializing the aforementioned counter to zero, if a value of the counter is zero or smaller.

4. The control method for an information processing apparatus according to claim 3, wherein
   the information processing apparatus is a personal computer comprising a broadcast receiver function.

5. An information processing apparatus, comprising:
   an input and output unit for inputting and outputting information;
   an indicator light for indicating visually whether an input and output operation is in progress or not; and
   an indicator light control unit, being furnished to a part of a basic input/output system (BIOS) and including a counter that indicates the number of input and output operations in progress, for controlling a turning on or off of the indicator light depending on the number indicated by the counter,
   wherein the counter is incremented by one at a start notification of said input and output operation from said input and output unit and decremented by one at an end notification of the input and output operation therefrom, and
   said indicator light control unit comprises a control logic for making said indicator light turn on if a value of the counter is one or greater, while making the indicator light turn off and initializing the aforementioned counter to zero, if a value of the counter is zero or smaller.

6. The information processing apparatus according to claim 5, wherein
   the information processing apparatus is a personal computer.

* * * * *

UNITED STATES PATENT AND TRADEMARK OFFICE
CERTIFICATE OF CORRECTION

| | | |
|---|---|---|
| PATENT NO. | : 7,792,409 B2 | Page 1 of 1 |
| APPLICATION NO. | : 11/275025 | |
| DATED | : September 7, 2010 | |
| INVENTOR(S) | : Masatoshi Kimura | |

It is certified that error appears in the above-identified patent and that said Letters Patent is hereby corrected as shown below:

Title page Column 2 (Other Publications), Line 4 delete "205-250363." and insert --2005-250363.--, therefor.

Signed and Sealed this
Eleventh Day of January, 2011

David J. Kappos
*Director of the United States Patent and Trademark Office*